REFLECTOR FOR SOLAR HEATERS

Filed June 26, 1959 3 Sheets-Sheet 1

INVENTOR
FRANK E. EDLIN

BY Harry J. McCauley

ATTORNEY

Oct. 16, 1962 F. E. EDLIN 3,058,394

REFLECTOR FOR SOLAR HEATERS

Filed June 26, 1959 3 Sheets-Sheet 2

INVENTOR
FRANK E. EDLIN

BY *Harry J. McCauley*

ATTORNEY

INVENTOR
FRANK E. EDLIN
BY Harry J. McCauley
ATTORNEY

United States Patent Office 3,058,394

Patented Oct. 16, 1962

3,058,394

REFLECTOR FOR SOLAR HEATERS

Frank E. Edlin, Wilmington, Del., assignor to E. I. du Pont de Nemours and Company, Wilmington, Del., a corporation of Delaware Filed June 26, 1959, Ser. No. 823,237
5 Claims. (Cl. 88—73)

This invention relates to an improved reflector for solar heaters, and particularly to a reflector of segmented compound parabolic construction which has a very wide aperture and high convergence efficiency.

Figure 1:
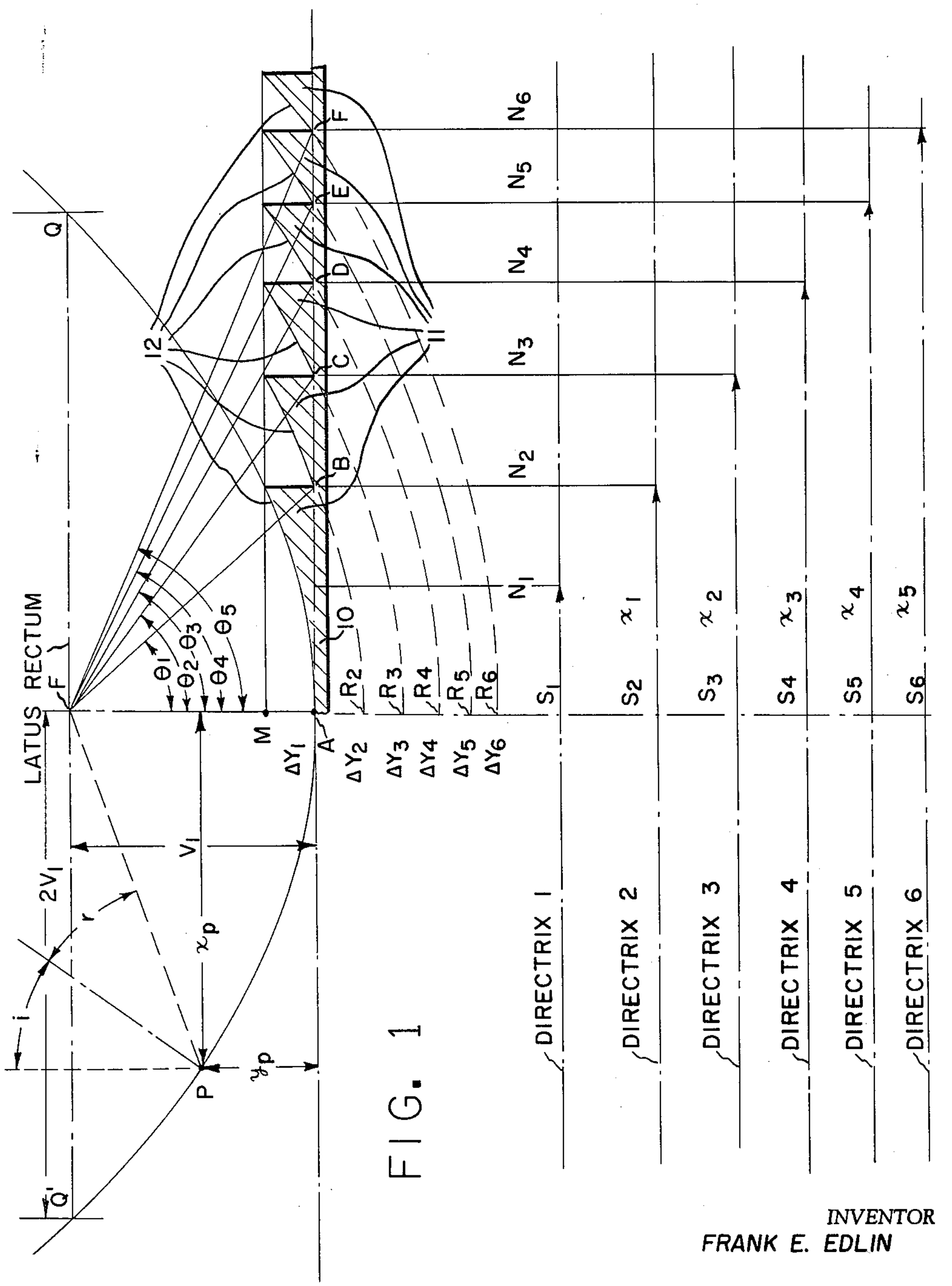
Figure 2A:
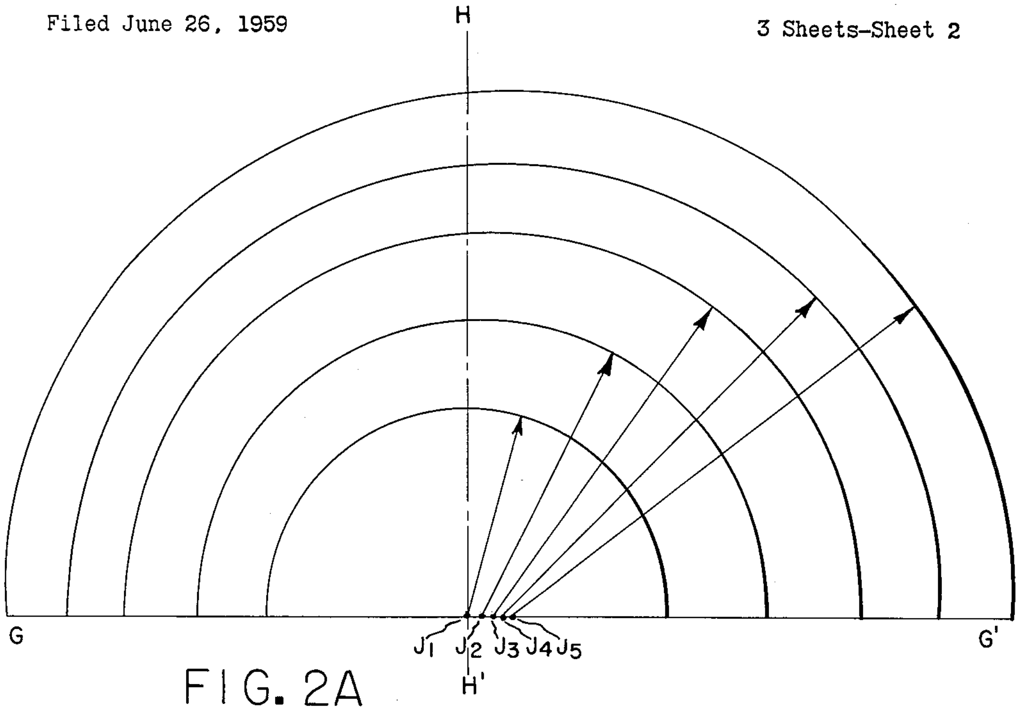
Figure 2:
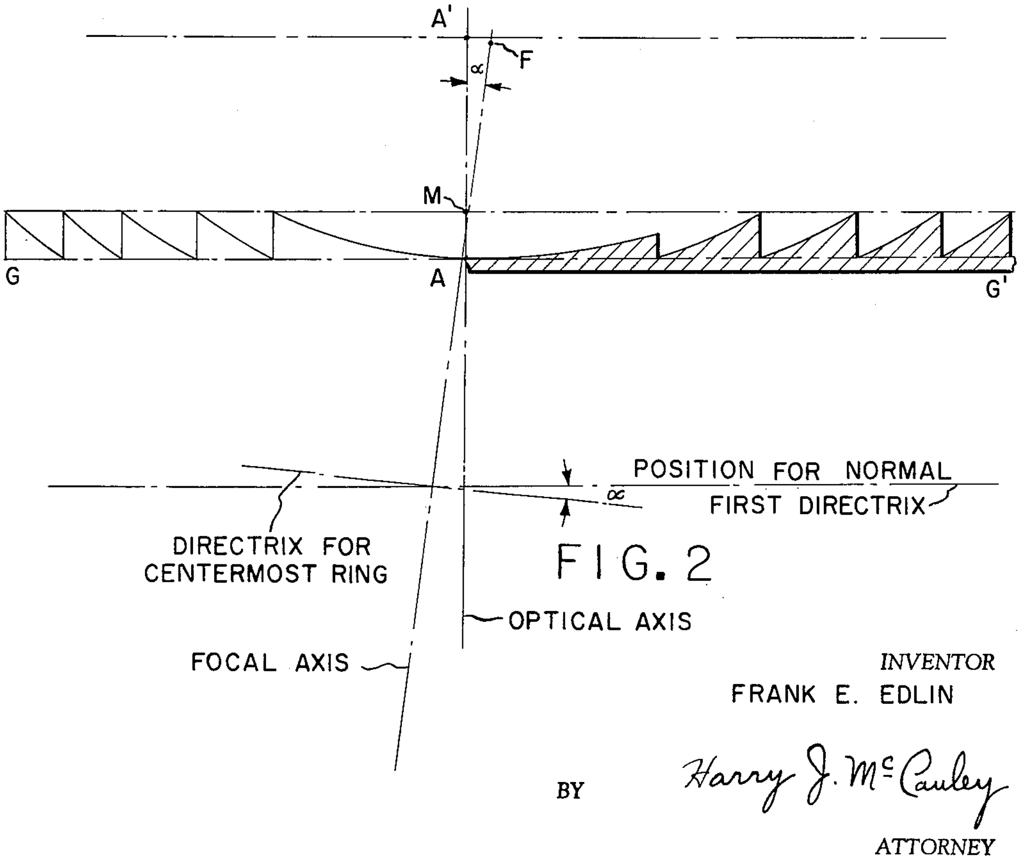
Figure 3:
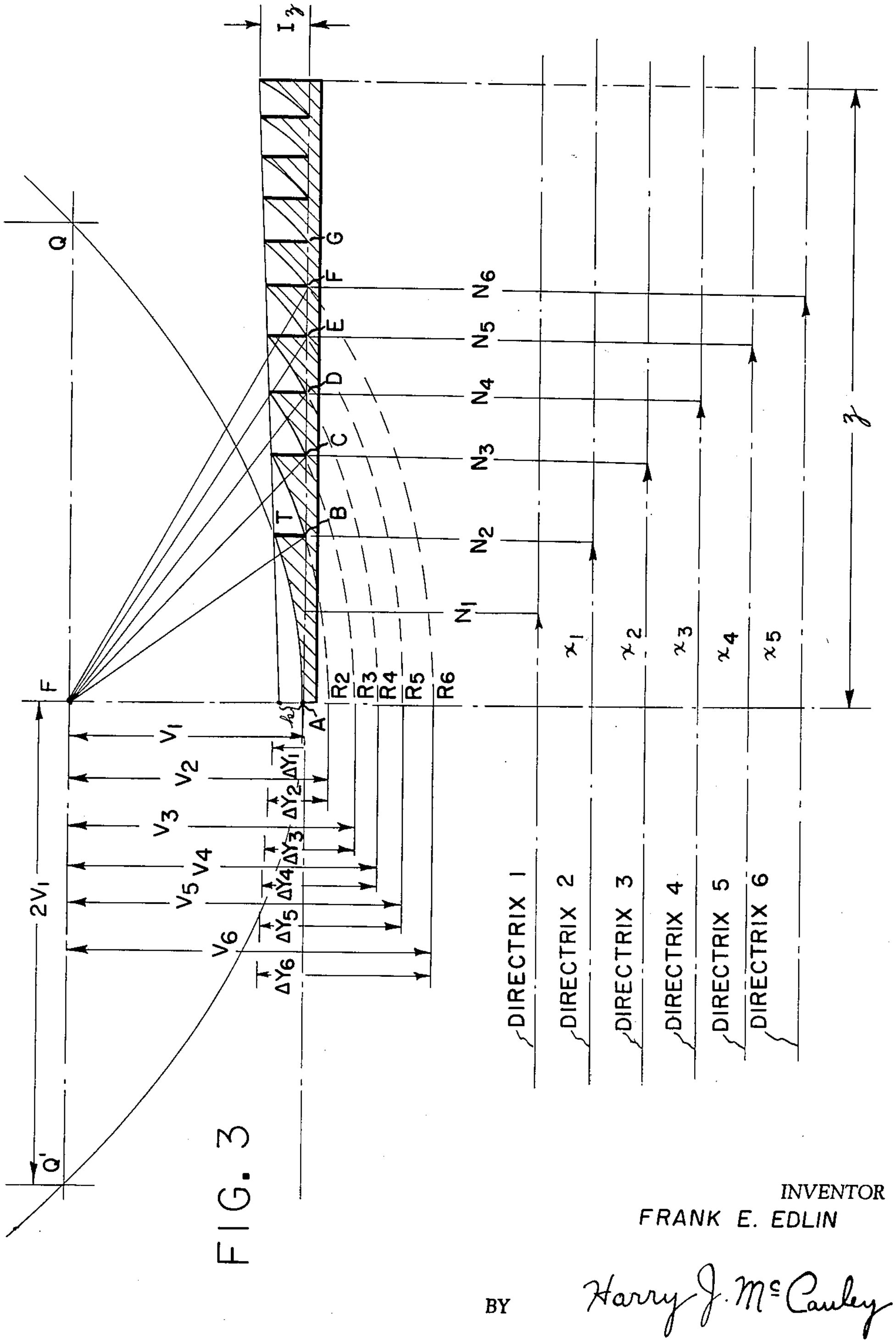

A great variety of reflectors for use in solar heating apparatus exists in the art; however, the optical elements employed are complex in design or interaction, and thus expensive to manufacture and limited in usefulness. A primary object of this invention is to provide an improved reflector for solar heaters embodying a segmented compound parabolic construction of relatively flat, even profile which has an extremely wide aperture and a high convergence efficiency. Another object of this invention is to provide a reflector for solar heating which is well-suited to manufacture from polymeric or coated fabric materials by conventional embossing techniques. Other objects of this invention are to provide a reflector for solar heating which is versatile in choice of focal region, and which can, in some embodiments at least, be used either flat or draped and conveniently transported or stored in compact form, particularly when fabricated from flexible materials. The manner in which these and other objects of this invention are attained will become apparent from the following detailed description and the drawings, in which:

FIG. 1 is a partially schematic representation in vertical cross section of the right-hand half of a preferred embodiment of solar reflector according to the invention consisting of an array of paraboloidal reflectors of equal maximum depth measured parallel to the optical axis, which are arranged concentrically with respect to a common optical axis and have a common focal region lying substantially on the optical axis, certain construction lines being also included to better convey an understanding of the essential characteristics of the invention, FIG. 2 is a partially schematic cross-sectional representation similar to that of FIG. 1, except that there is added an associated development in plan, FIG. 2A, showing a second embodiment of this invention wherein successive paraboloidal reflectors are offset with respect to the optical axis of the centermost and the several reflectors are, in effect, tilted, so that the common focal region is displaced a predetermined distance laterally from the central vertical drawn to the centermost reflector, and FIG. 3 is a partially schematic representation similar to that of FIGS. 1 and 2 showing yet another embodiment of this invention incorporating paraboloidal reflectors which resembles that of FIG. 1 in all respects, except that the maximum depths of the several paraboloidal elements are not equal one to another but, instead, are progressively increased in a predetermined manner from the centermost outwardly in order to obtain a configuration which has certain cleaning and other advantages.

Generally, this invention comprises a segmented compound reflector for solar heaters comprising a base sheet upon which a plurality of reflective surfaces having a parabolic profile when seen in normal cross section (i.e., as cut by a plane disposed perpendicular to the base sheet) are developed, as by embossing, for example, so that a substantially flat construction is obtained with all foci brought to a substantially common concentrated region. Preferably, the base sheet is fabricated from a flexible polymeric or polymer-coated fabric material, the top face of which is provided with a facing of solar reflective material in particulate, foil or other form, so that the composite reflector can be rolled up into compact form for convenience in either transporting or storing. The flat configuration of the reflectors is particularly advantageous where utilization is in wind-swept locations, as is quite usual, because there is less tendency for wind drag to fold the reflector on itself, or even turn it completely upside down. At the same time, there is improved self-scouring action, whereby the wind frees the grooves of the reflector, at least to some extent, of sand and dust which otherwise collects therein and binds the individual reflective elements.

This invention utilizes the basic configuration of the conventional Buffons-Fresnel light refracting lens, but as a light reflector instead of a light transmitter, with necessary modifications, which are more or less extensive in nature, in order to meet the singular requirements imposed by different uses.

According to the principles of analytic geometry, a parabola is defined as the locus of a point that moves in a plane so that its distance from a fixed line, called the directrix, is always equal to its distance from a fixed point, not on the line, called the focus. The general mathematical equation of a parabola symmetric with respect to the Y axis can then be written as $x^2=4V_y$, where V is the focal distance and $x$ and $y$ are the usual coordinates in the X—Y lane, the origin of the axes being taken as the vertex of the given parabola.

Referring now to FIG. 1, there is shown a preferred embodiment of this invention wherein 10 represents the base sheet and the embossments 11, disposed in the top face thereof, represent the several paraboloidal reflectors which present to the sun light-reflective surfaces 12. To simplify the showing, only the right-hand half of the reflector is shown in FIG. 1, it being understood that, in the completed reflector, the left-hand half is the exact mirror image of the right-hand half and, since the construction is paraboloidal, that each complete reflective surface 12 is, in fact, the surface developed by rotation through 360 degrees of each of the profiles of 12 about the common optical axis, which is indicated by line AF in FIG. 1.

A preferred material of fabrication is a solid polymeric substance, such as one of the commercially available vinyl resins, or the like, to the faces 12 of which there is imparted enhanced light reflectivity by coating with particulate aluminum metal, or foil, or a similar substance, as by the known techniques of sputtering, vapor deposition, metal spraying or the like, or by cementing, in the case of the foils. It will be understood that the light-reflective metal can be deposited on the base sheet either before or after the development of embossments 11; however, it is preferred to coat the base sheet prior to embossment, as the coating can then be effected continuously with better control of all of the process conditions.

From the general equation of the parabola, it will be understood that either the dependent variable $x$ or the independent variable $y$ may be varied as a matter of choice, while still retaining the parabolic profile which is essential to obtain a substantially common focal region for each of the plurality of light-reflective surfaces 12. However, this variation is limited by certain boundary conditions, such as the convenient height at which a focus is desired, for example, practical considerations bearing on the embossing or equivalent process of reflective element formation, and the like.

Thus, in a typical instance where the reflector was to be employed as the heater for a solar cooker, the convenient cooking height was chosen as 32 inches above ground level, and it was approximately here that the focal region was desired to be located. A reflector capable of producing approximately 1000 watts of cooking power on an ordinary sunny summer day was devised which was square in perimeter shape, measuring approximately 54 inches on a side, and which utilized paraboloidal reflectors of the shape shown in FIG. 1, which were embossed at equal maximum depths one with another measured parallel to the optical axis of 3/64″. It might be mentioned that, in plan, the upper face of this particular reflector had the appearance of a number of concentric circles of progressively increased radii until the nearest edges of the square were intersected. Thereafter, the circles were interrupted, so that their several sections were arcs of progressively smaller length in the directions of the diagonals, which were 78″ long, the entire expanse of the top of the base sheet thus being embossed. The focal region of this reflector was located in the neighborhood of point F, FIG. 1, it being understood that a point focus is not required and, in fact, is usually not desired in solar cooking and that concentration of the sun's rays within an area described on a flat surface, such as a cooking pan or plate grill, measuring about 1 inch—6 inches in diameter is preferred as a means of heating objects being cooked. There is thereby obtained more uniformity of heating of the objects without danger of burning holes completely through them, which is quite possible with the high light concentration powers of apparatus constructed according to this invention unless measures are taken to diffuse the reflected energy over a greater area than a small point. Such an eventuality can, in any case, be safeguarded against by merely positioning the reflector an appropriate distance from the object heated, which latter may be a pan, fluid-containing pipe, reaction vessel, still pot or any other object which it is desired to heat by solar energy.

As seen in FIG. 1, the several light-reflective surfaces 12 are each developed from individual parabolas which have their directrices lying in unique planes which, in this case, intersect optical axis AF, extended, normally at the points $S_1$, $S_2$, $S_3$, $S_4$, $S_5$, $S_6$, . . . $S_n$, respectively, and whose vertices lie on the same line at points A, $R_2$, $R_3$, $R_4$, $R_5$, $R_6$, . . . $R_n$. It will be noted that the vertical separations betwen directrix planes for successive surfaces 12 counted away from the optical axis, as well as the distances between the corresponding vertices, decrease progressively as one proceeds outwardly. The reason for this variance will be readily apparent when it is recognized that the same 3/64″ depth, for example, corresponding to a fixed $y$ coordinate, is measured progressively farther out on the X axis with each successive surface 12. Accordingly, since $y$ varies as the square of $x$, the corresponding increments $\Delta y_1$, corresponding to the outer limit (value of $x=x_1=B$) of the centermost parabolic reflector 12, $\Delta y_2$, corresponding to the outer limit (value of $x=x_2=C$) of the second reflector 12 in order from AF, and $\Delta y_3$, $\Delta y_4$, $\Delta y_5$, $\Delta y_6$, . . . $\Delta y_n$, each corresponding to all of the succeeding reflectors 12 must progressively decrease in value. This follows because the $\Delta y$ spacings are measured on the common line passing through the vertices of all of the parabolas and are not, therefore, compensated for the fixed selection of $y$ adhered to as $\theta$, the angle included between the optical axis and the construction lines running from point F to the several points B, C, D, E, F, and so on, increases.

As shown in FIG. 1, line Q′FQ is the latus rectum of the centermost parabola, i.e., the line segment passing through focus F and intersecting the parabola at point $(x, y)$ on the right and $(-x, y)$ on the left. From the definition of the parabola, $AF=AS_1$, because the distance from a point on the parabola to the focus F must equal the distance from the same point to the directrix line, here indicated as "Directrix 1." Also, from the properties of a parabola $$AF=AS_1=\frac{FQ}{2}=V_1$$

where V, with appropriate numerical subscript is hereinafter employed to designate the distance measured along the Y axis from focus F to the vertex of each of the parabolas corresponding to the individual light-reflective surfaces 12.

The sun's rays, to a very close approximation, impinge on the reflector along lines parallel to the optical axis. If the case of a single ray striking a light-reflective surface 12 of the reflector at any generalized point P is considered, the angle of incidence, $i$, measured to the normal to the parabolic surface, equals the angle of reflection, $r$, referred to the same normal, and the reflected ray passes to focus P. From the general equation of the parabola hereinbefore given, $x_p^2=4V_1y_p$, and, if the maximum embossing depth is fixed at $\Delta y$ (e.g., 3/64″), $x_p$, the outer bound of the first paraboloid can be calculated immediately, $V_1$ being known (e.g., selected to be 32 inches for the specific reflector hereinbefore described).

From the definition of a parabola, a point B on a parabolic curve passing through points B and $R_2$ must be disposed equidistantly from focus F and Directrix 2, i.e., $N_2=BF$. But BF is the hypotenuse of right triangle BAF and, accordingly, $$N_2=BF=\sqrt{x_1^2+V_1^2}$$

But, from the definition of a parabola, point A is the median of $FS_1$; also, point $R_2$ is the median of $FS_2$, and this relationship holds for all of the succeding parabolas. Thus, by the rule of proportionate ratios, $$AR_2=\frac{S_1S_2}{2}$$

If line $FR_2$ is represented by $V_2$, then $$V_2=V_1+AR_2=V_1+\frac{S_1S_2}{2}=V_1+\frac{N_2-N_1}{2}$$

where $N_1$, $N_2$ . . . $N_n$ are the perpendiculars drawn from the respective directrix lines to points B, C, etc., constituting the beginnings of the respective reflective surfaces 12 spaced along the X axis.

Accordingly, $$V_2=V_1+\frac{\sqrt{x_1^2+v_1^2}-N_1}{2}=V_1+\frac{\sqrt{x_1^2+v_1^2}-v_1}{2}$$

From the foregoing, $\Delta y_1=AM$, the maximum embossing depth, while the corresponding increment $\Delta y_2$, for parabola No. 2 generated from Directrix No. 2, is $MR_2$. So, $$\Delta y_2=\Delta y_1+AR^2=\Delta y_1+\frac{S_1S_2}{2}=\Delta y_1+\frac{\sqrt{x_1^2+v_1^2}-v_1}{2}$$

from the equations hereinbefore developed. This now permits calculation of $x_2$ from the general parabolic equation $(x_2)^2=4V_2\Delta y_2$, since $V_2$ and $\Delta y_2$ are now known, and, after simplification of the formal calculations, the following expression for $x_2$ in terms of $x_1$, $V_1$ and $\Delta y_1$ is obtained: $(x_2)^2=x_1^2+2\Delta y_1V_1+2\sqrt{x_1^2+V_1^2}\Delta y_1$ or, generalized as an expression for iterative computation of all parabolas from the centermost outwards, where the subscript $n$ refers to the order of any given reflective surface 12 considered in sequence along the X axis from AF:

$$x_n^2=x_{n-1}^2+2\Delta y_{n-1}V_{n-1}+2\sqrt{x_{n-1}^2+V_{n-1}^2}\Delta y_{n-1}$$

The tabulated dimensions of the first fifteen reflective surfaces 12 of the embodiment of FIG. 1, wherein the focal length was preselected as 32 inches and the maximum embossing depth $\Delta y_1 = AM$ was 3/64", are as follows:

| Reflective Surface 12 No. Counted From AF | Radial Distance Measured in Inches Along X Axis From AF to Outer Edge of Each Reflective Surface 12 | Radial Width of Individual Reflective Surfaces 12 Measured in Inches Along X Axis |
|---|---|---|
| 1 | 2.449 | 2.449 |
| 2 | 3.465 | 1.016 |
| 3 | 4.245 | 0.780 |
| 4 | 4.904 | 0.659 |
| 5 | 5.485 | 0.581 |
| 6 | 6.011 | 0.526 |
| 7 | 6.495 | 0.484 |
| 8 | 6.946 | 0.451 |
| 9 | 7.370 | 0.424 |
| 10 | 7.771 | 0.401 |
| 11 | 8.153 | 0.382 |
| 12 | 8.519 | 0.366 |
| 13 | 8.870 | 0.351 |
| 14 | 9.208 | 0.338 |
| 15 | 9.534 | 0.327 |

While the foregoing description is directed specifically to a reflector having paraboloidal surfaces 12 generated by rotation of parabolic profiles a full 360° about AF, it will be understood that exactly the same profile development as that shown in FIG. 1, but extended along lines normal (i.e., perpendicular) to the plane of the drawing paper, results if the parabolas of generation are translated linearly along these normal lines. There is thereby obtained a reflector which produces a focus along a line perpendicular to the plane of the drawing paper. This design is particularly advantageous where an elongated pipe or similar conduit is to be heated. Also, it is possible to drape such a straight run reflector from supports transverse the lengths of surfaces 12 to thereby obtain a free-hanging catenary, which approximates a paraboloid closely in reflective properties. It is in this way practicable, with proper choice of the drape depth, to obtain an immediate conversion from line focus to substantially point focus.

Referring to FIGS. 2 and 2A, a second embodiment of this invention is shown wherein the focal axis AF is inclined at an angle $\alpha$ with respect to the optical axis AA', and the focus F is displaced correspondingly downward from the location it had coincident with the optical axis in the embodiment of FIG. 1. Such a design is advantageous where, for any particular reason, an offset focus must be preserved for the reflected solar energy.

To achieve the desired result, the centermost parabola is, in effect, tilted in a clockwise direction an angle $\alpha$, which tilts the directrix the same angle in the same direction. This cocking effect is repeated for all succeeding rings, the effect thereupon being, for a uniform maximum embossing depth as before, that a somewhat more concave section of each reflective surface 12 than in FIG. 1 is presented to the incoming sun's rays to the left of line AF as seen in FIG. 2, while a less concave area is presented to the right of this line. The result, as seen in plan in FIG. 2A, is a series of reflective surfaces 12 which have an elliptical perimeter in which the major axes lie along line GG' and the minor axes will, of course, be parallel to the Y axis (i.e., line HH'). This is due to the progressive widening of the reflective surfaces in going clockwise from 9 o'clock position in FIG. 2A to 3 o'clock position, followed by an exactly reverse narrowing in returning during continued rotation clockwise from 3 o'clock position to 9 o'clock position again. At 12 o'clock and 6 o'clock positions (i.e., along the minor axes) the ellipses have precisely the same limiting dimensions as calculated for a reflector of symmetrical paraboloidal configuration such as that of FIG. 1 having, of course, the same maximum embossing depth.

If $x_n'$ and $V_n'$ represent the values of $x$ and V as hereinbefore described, except referred now to the inclined focal axis AF, I have found that the value of $x_n'$ struck along GG' to the right of the intersection of axes shown in FIG. 2 can be calculated from the expression:

$$x_n' = f(x_n - x_{n-1}) \text{ secant } \frac{\alpha}{2}$$

where $$f = \cos\left(\text{arc tan } \frac{x_{n-1}}{V_{n-1}}\right)$$

while the corresponding value of $x_n'$ struck along GG' to the left of the intersection of axes shown in FIG. 2 can be calculated from the expression:

$$x_n = \cos\left(\text{arc tan } \frac{x_{n-1}}{V_{n-1}}\right)(x_n - x_{n-1}) \tan \frac{\alpha}{2}$$

it being understood that $x_n$, $x_{n-1}$ and $V_{n-1}$ are calculated in the identical manner already described for the embodiment of FIG. 1. The centers of the successive ellipses after the centermost, the center of which is indicated at $J_1$, are displaced progressively to the right along line GG' as indicated in FIG. 2A by points $J_2$, corresponding to the first reflective surface 12 after the centermost, and $J_3$, $J_4$, $J_5$, etc., for the next-following reflective surfaces, so that the minor axes all lie on unique lines parallel to line HH'. The rays drawn from the several centers J to the limiting perimeters have no significance except to clearly indicate the association of specific centers with the corresponding specific ellipses.

It has proved difficult to machine a succession of ellipses on different centers as hereinbefore described with respect to FIGS. 2 and 2A, and, accordingly, I have settled on an approximation which produces a reflector with an offset focus, and yet one which can be easily formed. This approximation consists in merely shaping the outer perimeters to circular patterns having progressively offset centers J located exactly as hereinbefore described for the elliptical embodiment, retaining, of course, the same tilted parabolic profile as already described in order to achieve the necessary offset focus. The radii of each of the circular perimeter paraboloids should be dimensioned at one-fourth the sum of the major and minor axes as hereinbefore calculated, under which conditions there is obtained a fairly constricted offset focal region which is, however, increased in cross-sectional area about three-fold over that of FIG. 1 (typically 1 inch diameter) but which still is effective in many heating applications. In this connection, an embossing die shaped in accordance with the approximation procedure can have the most radially inward parts (e.g., up to 1/3 or 1/2 of the full surface width) of the several reflective surfaces 12 formed by a precisely guided tool, such as a milling machine, while the remainder of the surfaces can be hand-ground and lapped along linear extensions running from the outermost extremities of the machine-cut surfaces without effecting the focusing pattern too deleteriously.

FIG. 3 illustrates the development rationale for a solar reflector wherein the maximum embossing depths for successive light-reflective surfaces 12 are each different and, in this instance, increase linearly from the centermost surface in an outward direction radial from the optical axis AF. The reflector of FIG. 3 has its focus on the optical axis, AF, and its several concentric parabolic profiles developed from the individual Directrix lines 1, 2, 3, etc., normally disposed with respect to the optical axis extended, so that the reflector resembles that of FIG. 1, except that no constant maximum embossing depth has been adhered to in the formation.

From the general equation of the parabola, $$(x_p)^2 = 4Vy_p$$

which can be rearranged to the form $(x_p)^2/y_p = 4V$, where V can be arbitrarily selected to suit the requirements of a particular design, it will be seen that it is feasible to vary both $x_p$ and $y_p$ in a wide variety of ways while still retaining the light-concentrating characteristics of parabolic geometry.

In the embodiment of FIG. 3, it is desired to increase the maximum embossing depth linearly from a value $k$ for the center of the central ring to a value $I_z$ for the outermost ring of the reflector. Accordingly, at the outer limit of the centermost ring, $y=BT$, where $$BT=k+\frac{x_1}{z}(I_z-k)$$

where $z$ is a preselected distance measured radially from the optical axis AF to the outer extremity of the last ring. The equation for the centermost parabola can then be written as:

$$x_1^2=4V_1\left[k+\frac{x_1}{z}(I_z-k)\right]$$

or, more simply, where the slope $$w=\frac{I_z-k}{z}$$

after multiplying through and simplifying the arrangement of the terms, as the quadratic equation:

$$\frac{x_1^2}{4V_1}-x_1w-k=0$$

The maximum embossing depth for the second reflective surface 12 counted in order from center A outwardly can then be calculated from the corresponding equation applicable to FIG. 1 as:

$$\Delta y_2=\Delta y_1+w(x_2-x_1)+\frac{\sqrt{x_1^2+V_1^2}-V_1}{2}$$

Then, paralleling the mathematical development applicable to the embodiment of FIG. 1:

$$x_2^2=4\left[V_1+\frac{\sqrt{x_1^2+V_1^2}-V_1}{2}\right]\left[wx_2-wx_1+\Delta y_1+\frac{\sqrt{x_1^2+V_1^2}-V_1}{2}\right]$$

or $$(x_2)^2=[\sqrt{x_1^2+V_1^2}+V_1][2wx_2-2wx_1+2\Delta y+\sqrt{V_1^2+V_1^2}-V_1]$$

Once $x_2$ is determined, $V_2$ can be calculated by simply applying the general parabolic equation, $x_2^2=4V_2\Delta y_2$. Thus, there is provided a perfectly general iterative procedure for a varying embossment depth reflector which permits precise computation of the limiting $x$, $y$ values for each successive light-reflective surface 12 in orderly progression from the center out.

The linearly increased maximum depth of surfaces 12 in FIG. 3 is advantageous in certain instances where increased strength of the reflector is needed in direct proportion to spacing from the center. It will be particularly understood that the variation expressed by the quantity $w$ in this equation hereinbefore set forth is not at all restricted to a linear variation in maximum embossed depth but that the variation may be parabolic, hyperbolic, elliptical or, in fact, any combination of these or other curves, with or without interspersed linear sections of reflective surfaces, so that a wide variety of designs exist for applicability to different situations.

It will be understood that for all of the embodiments of reflector hereinbefore described and shown in FIGS. 1–3, inclusive, it is not necessary that the reverse slope of the several light-reflective surfaces 12 be cut vertically but, instead, these slopes may be more or less inclined in an opposite direction from surfaces 12 without any loss in light concentrating efficiency whatever, so long, of course, as they do not obtrude beyond the course of straight lines drawn from the focus to the points of origin in base sheet 10 where the next-succeeding parabolic profile commences.

Some polymeric substances display substantial relaxation tendencies subsequent to embossing and this can cause marked departures from the mathematical relationships hereinbefore elaborated, with accompanying undesirable alterations in the focus obtained. Ordinarily, the relaxation properties of the material being worked with are known sufficiently quantitatively to permit of appropriate dimensional compensation in the embossment molding. Thus, with one typical polymer, it was found that there was a relaxation increase in diameter after stripping of the reflector from the mold of approximately 3%. Accordingly, a proportionate correction was applied throughout, in that $1.03x_p$ was substituted for $x_p$ as, for example, in the general expression to give $(1.03x_p)^2=4Vy_p$, satisfactory compensation for the relaxation being achieved without other change in the computation already described.

From the foregoing, it will be apparent that this invention may be modified extensively within the knowledge of the art without departure from its essential spirit, and it is intended to be limited only within the scope of the following claims.

What is claimed is:

1. A reflector for a solar heater comprising a plurality of individual light-reflective surfaces each of which, in cross section in a plane normal thereto, has a substantially parabolic profile generated from directrices each lying in a unique plane preselected so that said light-reflective surfaces reflect light incident thereon to a common focal region, said light-reflective surfaces originating at their closest spacings from the axis of said reflector in substantially a common plane coparallel with said directrices.

2. A reflector for a solar heater according to claim 1 wherein all of said individual light-reflective surfaces are of substantially equal maximum depth in a direction measured along the vertical.

3. A reflector for a solar heater comprising a plurality of individual light-reflective surfaces disposed substantially symmetrically with respect to a common optical axis, each having a parabolic profile in a plane normal to said surfaces including said common optical axis conforming to a parabola with vertex lying in line with said optical axis and generated from a directrix lying in a unique plane perpendicular to said optical axis, said light-reflective surfaces originating at their closest spacings from said optical axis in substantially a common plane coparallel with said directrices.

4. A reflector for a solar heater comprising a plurality of individual paraboloidal light-reflective surfaces disposed concentric with respect to a common optical axis, each of said surfaces having its vertex lying in line with said optical axis and with its directrix lying in a unique plane perpendicular to said optical axis, said light-reflective surfaces originating at their closest radial spacings from said optical axis in substantially a common plane coparallel with said directrices.

5. A reflector for a solar heater comprising a plurality of individual paraboloidal light-reflective surfaces successive ones of which are disposed radially outwards from a vertical line passed through the geometric center of the centermost of said surfaces, said centermost surface having its focus offset a predetermined angle from said vertical line and all other said surfaces after said centermost surface having their vertices displaced laterally from said vertical line in a plane including said vertical line and said focus an amount such that each of said other surfaces reflects light incident thereon to a common focal region including said focus of said centermost surface, said light-reflective surfaces originating at their closest radial spacings from said vertical line in substantially a common plane coparallel with said directrices.

References Cited in the file of this patent

UNITED STATES PATENTS 340,490 Cummings ------------ Apr. 20, 1886

(Other references on following page)

UNITED STATES PATENTS

| | | |
|---|---|---|
| 1,390,258 | Geneste | Sept. 6, 1921 |
| 1,535,985 | Clark | Apr. 28, 1925 |
| 1,951,404 | Goddard | Mar. 20, 1934 |
| 2,547,342 | Nirdlinger | Apr. 3, 1951 |
| 2,625,930 | Harris | Jan. 20, 1953 |
| 2,698,561 | Crowell | Jan. 4, 1955 |
| 2,707,903 | Trombe | May 10, 1955 |
| 2,751,816 | Strong | June 26, 1956 |
| 2,859,745 | Von Brudersdorff | Nov. 11, 1958 |
| 2,945,417 | Caryl et al. | July 19, 1960 |

FOREIGN PATENTS

| | | |
|---|---|---|
| 19,900 | Great Britain | Sept. 22, 1908 |

UNITED STATES PATENT OFFICE
CERTIFICATE OF CORRECTION

Patent No. 3,058,394 October 16, 1962

Frank E. Edlin

It is hereby certified that error appears in the above numbered patent requiring correction and that the said Letters Patent should read as corrected below.

Column 2, line 15, for "binds" read -- blinds --; line 29, for "$x^2=4V_y$" read -- $x^2=4Vy$ --; same column 2, line 31, for "lane" read -- plane --; column 4, line 22, for "$x_p{}^2=4V_1{}^y{}_p$" read -- $x_p{}^2=4V_1y_p$ --; lines 51 to 53, the formula should appear as shown below instead of as in the patent:

$$V_2=V_1+\frac{\sqrt{x_1{}^2+V_1{}^2}-N_1}{2}=V_1+\frac{\sqrt{x_1{}^2+V_1{}^2}-V_1}{2}$$

same column 4, lines 58 to 60, the formula should appear as shown below instead of as in the patent:

$$\Delta y_2=\Delta y_1+AR_2=\Delta y_1+\frac{S_1S_2}{2}=\Delta y_1+\frac{\sqrt{x_1{}^2+V_1{}^2}-V_1}{2}$$

same column 4, lines 72 and 73, the formula should appear as shown below instead of as in the patent:

$$x_n{}^2=x_{n-1}{}^2+2\Delta y_{n-1}V_{n-1}+2\sqrt{x_{n-1}{}^2+V_{n-1}{}^2}\Delta y_{n-1}$$

column 7, lines 41 and 42, the formula should appear as shown below instead of as in the patent:

$$(x_2)^2=[\sqrt{x_1{}^2+V_1{}^2}+V_1][2wx_2-2wx_1+2\Delta y_1+\sqrt{x_1{}^2+V_1{}^2}-V_1]$$

Signed and sealed this 5th day of March 1963.

(SEAL)
Attest:

ESTON G. JOHNSON
Attesting Officer

DAVID L. LADD
Commissioner of Patents